J. A. RICKETTS.
FISH LINE REEL.
APPLICATION FILED MAR. 29, 1911.
1,038,203.
Patented Sept. 10, 1912.
2 SHEETS—SHEET 1.
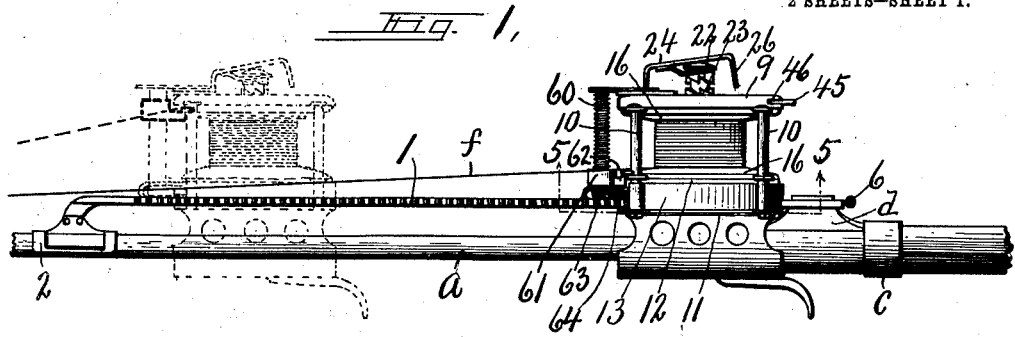
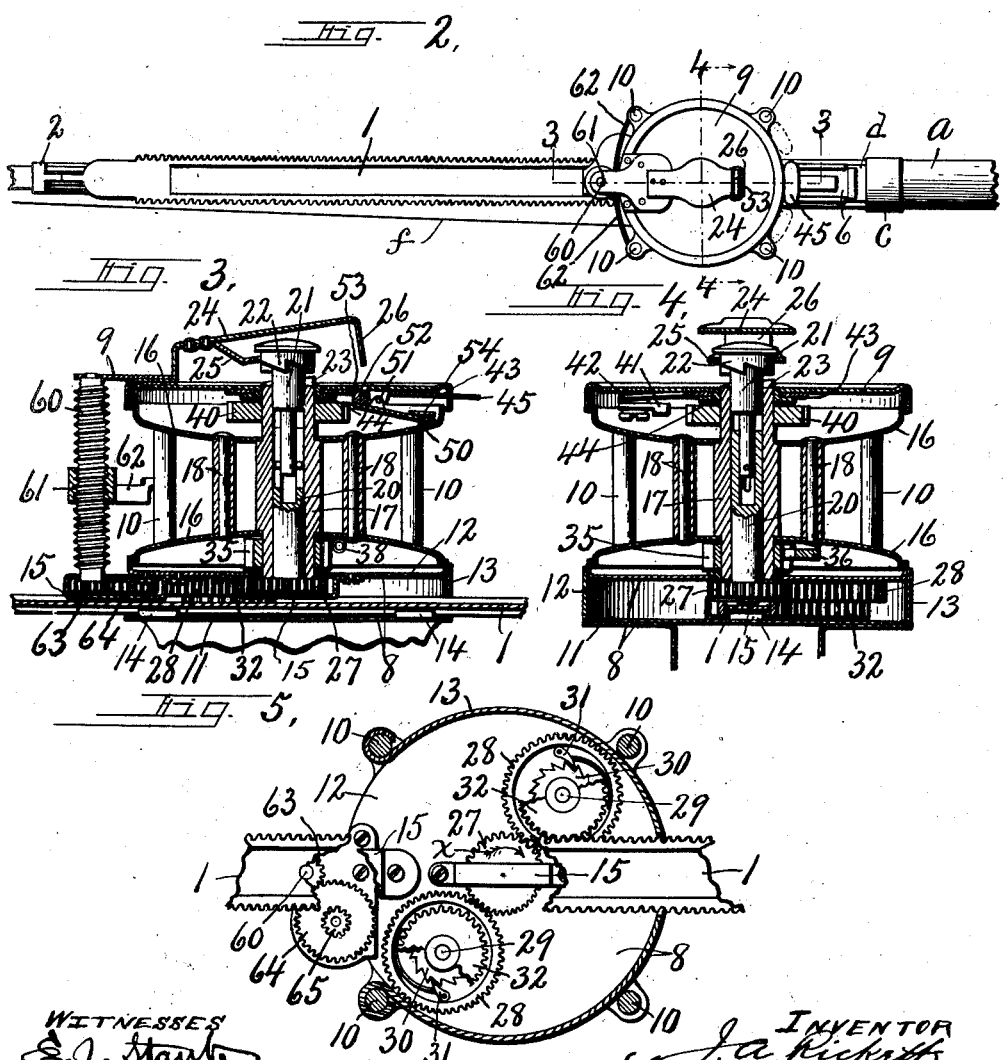
WITNESSES
INVENTOR
J. A. Ricketts
By Howard P. Denison
ATTORNEY J. A. RICKETTS.
FISH LINE REEL.
APPLICATION FILED MAR. 29, 1911.
1,038,203.
Patented Sept. 10, 1912.
2 SHEETS—SHEET 2.
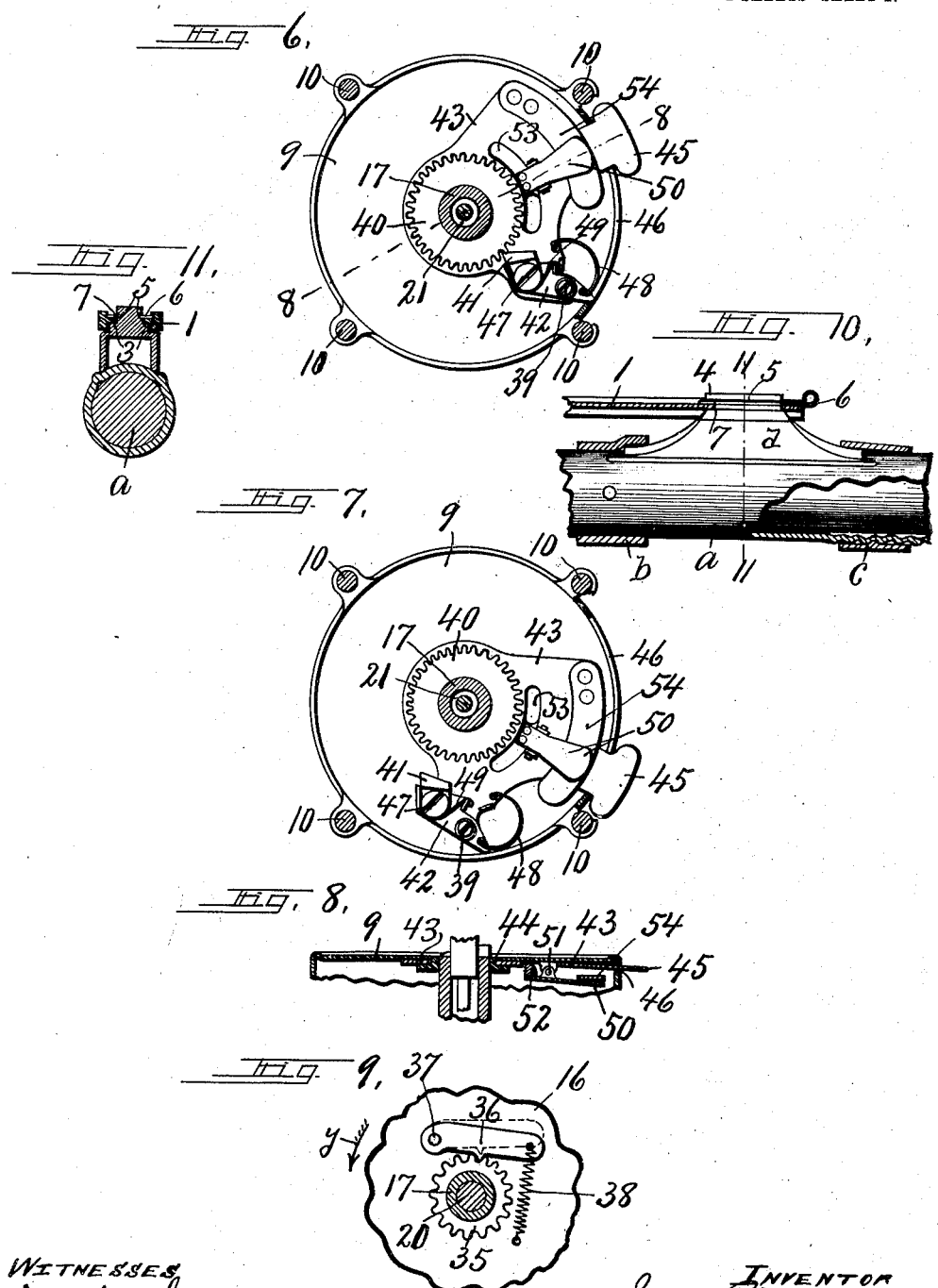

UNITED STATES PATENT OFFICE.

JOHN A. RICKETTS, OF ROCHESTER, NEW YORK.

FISH-LINE REEL.

1,038,203.  Specification of Letters Patent.  Patented Sept. 10, 1912.

Application filed March 29, 1911. Serial No. 617,716.

*To all whom it may concern:*

Be it known that I, JOHN A. RICKETTS, of Rochester, in the county of Monroe, in the State of New York, have invented new and useful Improvements in Fish-Line Reels, of which the following, taken in connection with the accompanying drawings, is a full, clear, and exact description.

This invention relates to certain improvements in fish line reels of the class set forth in my pending application #538,612 filed January 18, 1910 in which rotary motion is imparted to the reel by reciprocatory motion of the reel-supporting frame along and upon the rod.

This reel constitutes a unitary article of manufacture separate from the rod so that it may be applied to any fish rod having the usual reel-clamping sleeves whereby it may be easily and quickly removed or replaced at will without in any way altering or reconstructing any part of the pole or rod. It therefore follows that the reel proper or "spool" as it is commonly termed must be located some distance to one side of the axis of the rod and preferably at right angles thereto so that when the line is threaded through the eyelets on the rod, its winding and unwinding is confined more to the inner end of the spool nearest the rod, or in other words its tendency is to pile up at one end of the reel during the winding operation, thereby utilizing only a portion of the spool.

One of the objects of my present invention is to automatically and evenly distribute the winding and unwinding of the line over the entire length of the spool and thereby permit a more uniform tension of the line without liability of becoming caught or tangled on the reel.

Another object is to provide simple means adjustable at will for causing the reel to operate freely or under a slight drag and also with or without an audible click.

A further object is to provide a slip connection between the spool and its driving spindle for permitting an independent but retarded action of the spool even though the clutch mechanism may be in its operative position for connecting the reel to its driving mechanism so as to prevent the line from breaking or the hook from pulling out of the flesh of the fish in case the latter should make a sudden plunge for liberty and also to prevent breakage of the line under the same or any other conditions tending to overtension such line.

A still further object is to provide simple means for detachably locking one end of the toothed rack to the clamping foot.

Other objects and uses will be brought out in the following description.

In the drawings—Figures 1 and 2 are respectively a side elevation and a top plan of a portion of a fish rod showing my improved reel thereon, the dotted lines in Fig. 1 showing the reel frame as shifted from its normal back position to its forward position. Figs. 3 and 4 are enlarged lengthwise and transverse sectional views of the same reel taken respectively on lines 3—3 and 4—4 Fig. 2. Fig. 5 is an enlarged inverted sectional view of the reel taken on line 5—5, Fig. 1 showing more particularly the gear trains and ratchet actions, a portion of the toothed rack along which the reel is movable being shown in inverted plan. Figs. 6 and 7 are inverted plan views of the outer end cap of the reel supporting frame showing the mechanism for controlling the click, drag and reel-release in different positions and also showing the reel hub and driving shaft in section, said mechanism being shown in its clicking position in Fig. 6 and in its reel releasing position in Fig. 7. Fig. 8 is a detail sectional view taken on line 8—8 Fig. 6. Fig. 9 is an inverted plan of the inner end of a portion of the spool showing the ratchet retarding action constituting the slip connection between the spool flanges and head. Fig. 10 is an elevation, partly in section, of a portion of the rod showing the means for detachably clamping one end of the toothed rack thereto. Fig. 11 is a transverse sectional view through the clamping foot and adjacent portion of the toothed rack taken on line 11—11 Fig. 10.

The line reeling mechanism forming the subject matter of my invention may be applied to any fish rod as —a— having the usual fixed clamping sleeve —b— and movable sleeve —c— for receiving and retaining a detachable foot —d— which is preferably located near the handle of the rod, said line reeling mechanism comprising a toothed rack —1— extending some distance lengthwise of the rod and having one end detachably secured to the clamping foot —d— and its opposite end provided with a spring clamp —2— for gripping the adjacent portion of the rod —a—, leaving a clear open between the rack —1— and rod for the operation of suitable mechanism hereinafter described. The outer portion of the clamping foot —d— is reduced in width forming seats or shoulders —3— for the adjacent end of the rack —1— and is provided with a forwardly projecting lip —4— and lengthwise grooves —5—, the latter serving to receive a furcated locking member —6— which, together with the lip —4— serves to hold the adjacent end of the rack —1— in operative connection with the clamping foot —d— as best seen in Figs. 10 and 11. This end of the toothed rack —1— is provided with a lengthwise slot —7— of substantially the same transverse width as the reduced portion of the clamping foot —d— which it is adapted to receive and is substantially the same length as said reduced portion less the length of the overlapping lip —4— so that when the locking member —6— is withdrawn from its locking position, the rear end of the foot —d— may be rocked downwardly and then drawn rearwardly to detach the foot from the toothed rack, the object of which is to facilitate packing of the parts for storage or transportation, it being understood, of course, that in order to detach the foot from the rack in the manner described, it is first necessary to withdraw the clamping sleeve —c— rearwardly to permit the foot to be withdrawn from the other clamping sleeve —b—, thereby drawing the rack —1— and its clamping member —2— in the same direction along the rod and permitting the rear end of the rack to be raised sufficiently to permit the removal of the clamping shoe or foot.

Slidably mounted upon the toothed rack —1— is a substantially circular reel-supporting frame comprising a gear case —8— and an outer cap —9— spaced some distance apart from the gear case and connected thereto by a series of, in this instance four, spacing members —10— arranged in pairs circumferentially around the margin of the frame equi-distant apart and at opposite sides of the toothed rack —1—.

The gear case —8— preferably comprises inner and outer plates —11— and —12— located respectively beneath and above the rack —1— and connected by a circular wall —13— having openings in diametrically opposite sides thereof for the reception of the toothed rack —1—. This rack is preferably provided with central lengthwise grooves in its inner and outer faces for the reception of guide members —14— and —15— on the inner and outer plates —11— and —12— for guiding the reel-supporting frame in its reciprocatory movement along said rack.

I preferably provide both of the opposite lengthwise edges of the rack —1— with teeth extending substantially the entire length thereof, said length being preferably two and one-half or three times the diameter of the reel so as to afford a comparatively long stroke in the operation of winding the line on the spool in a manner presently described.

*Spool operating mechanism.*—Rotatably mounted with the reel-supporting frame between the gear case —8— and cap —9— is a reel member or spool consisting, in this instance, of opposite end heads or sheet metal flanges —16— which are loosely mounted upon a tubular hub —17— and are held a fixed distance apart by spacing members —18— as best seen in Figs. 3 and 4.

The end heads or flanges —16— of the reel are preferably cup-shape or concavo-convex with their convex sides facing each other and their marginal edges surrounded by suitable flanges on the inner and outer plates —12— and —9— in such manner as to permit the spool to rotate freely therein and at the same time preventing any liability of the line as —f— becoming caught between the end heads of the spool and adjacent portions of the frame.

The opposite ends of the hub —17— are journaled in suitable bearings in the outer and inner plates —9— and —12— of the main supporting frame and the hub adapted to be rotated in a manner hereinafter described as the reel-supporting frame is moved lengthwise of the toothed rack —1—.

The spacing members —18— are arranged circumferentially around the hub —17— a uniform distance apart and some distance within the periphery of the heads or flanges —16— and constitute the main support for the line —f—, one end of which is fastened to one of the spacing members so as to positively wind the line thereon as the reel is rotated.

Journaled within the tubular hub —17— is a driving shaft or spindle —20— having an axially movable section —21— which is splined or feathered to the section —20— so as to rotate therewith and at the same time is free to move axially. The section —21— extends outwardly through and some distance beyond the outer end of the tubular hub —17— and is provided with a clutch face —22— movable into and out of engagement with a corresponding clutch face —23— on the adjacent end of the hub —17— and is normally held out of engagement with said hub by means of an arm —24— having a forked extension —25— for direct engagement with the underside of the head of the shaft section —21—. One end of the spring arm —24— is rigidly secured by suitable fastening means to the outer face of the cap —9— some distance at one side of the shaft section —21— and extends diametrically across and some distance to the opposite side of said shaft section where it is provided with an inwardly projecting shoulder or offset —26— for a purpose hereinafter described. The arm —24— is tensioned to normally spring outwardly and thereby hold the clutch section —22— out of engagement with the corresponding clutch section —23— of the head —17— and is adapted to be moved inwardly by pressure of the thumb or finger to force said clutch sections into operative engagement and thereby lock the shaft 20— to the tubular head —17— for rotating the spool when rotary motion is transmitted to the shaft —20—.

Rigidly secured to the lower end of the shaft section —20— is a gear —27— meshing with diametrically opposite gears —28— which are loosely journaled on separate supporting spindles —29— and are connected by suitable ratchet wheels —30— and pawls —31— to separate coaxial gears —32—. The gears —32— mesh with the teeth on opposite sides of the toothed rack —1— and are rigidly secured to their respective ratchet wheels —30— each of which together with its corresponding pawl —31— is so arranged as to alternately rotate the shaft —20— in the same direction as the reel-supporting frame is moved in opposite directions along the rack —1—. In order to accomplish this result, the pawls —31— are pivotally mounted upon their respective gears —28— and together with the teeth of the corresponding ratchet wheels are arranged in reverse relation as clearly shown in Fig. 5 so that when the reel frame is moved in one direction, the teeth of one of the ratchet wheels will engage the corresponding pawl and thereby rotate the adjacent gear —28— in the same direction and the gear —27— and the driving shaft —20— in the opposite direction and at the same time transmitting rotary motion to the opposite gear —28— and causing its pawl —31— to trail over the teeth of the correspoding ratchet wheel —30— and at the same time allowing the adjacent gear —32— to be rotated idly by reason of its engagement with the corresponding side of the rack —1—, the reverse operation taking place when the reel-supporting frame is moved in the opposite direction. It therefore follows that as the reel-supporting frame is moved forwardly and backwardly or in reverse directions along the toothed rack —1—, the gear —27— and its driving shaft —20— will be rotated in the same direction indicated by arrow —X— Fig. 5 and that when the clutch sections —22— and —23— are brought into engagement with each other by the depression of the spring arm —24—, similar rotary motion in the same direction will be transmitted to the hub —17— and spool heads —16— of the reel for winding the line on the spacing members —18—.

The gears, ratchets and pawls thus far described for imparting rotary motion to the shaft —20— as the reel-supporting frame is reciprocated along the toothed rack —1— are substantially identical with those shown, described and claimed in my pending application previously referred to and therefore need not be herein further illustrated or described.

The object in loosely mounting the spool heads —16— upon the tubular head —17— is to permit independent rotation of this portion of the reel upon which the line is actually wound so as to prevent breaking of the line or tearing of the flesh of the fish when hooked in case such fish should make a sudden dash for liberty on a slack line and in order to transmit rotary motion from the hub —17— to the spool heads —16— under normal tension on the line, I provide the inner or lower end of the hub —17— with a circular toothed member or gear —35— rigid thereon and having its teeth frictionally engaged by a pawl —36— which is pivoted at one end at —37— to the inner side of the inner head —16— and having its opposite end also connected by a spring —38— to the same head so that the pawl is spring pressed into contact with the teeth of the wheel —35— as best seen in Figs. 3, 4 and 9. The tooth on the pawl —36— is located between the pivot —37— and the point of connection with the spring —38— and permits the spool heads —16— to rotate under a frictionally retarded action in the direction indicated by arrow —Y— Fig. 9 for unwinding the line from the reel under a comparatively strong pull or high tension on the line and at the same time forming a sufficiently positive drive to wind the line on the reel under a normal tension. This independent action of the reel is therefore automatic and is useful only when the clutch members —22— and —23— are thrown into action during the operation of reeling the line when hooked into a fish so as to more effectively prevent tearing out of the flesh of the fish or breaking of the line and at the same time producing a relatively loud safety click to warn the operator of the hooking of a fish or other object.

*Click, drag and release control.*—In addition to the abnormal drag and click of the reel produced by the action of the pawl —36— on the gear —35—, another or somewhat lighter click and drag mechanism together with the reel-releasing means are provided and adapted to be brought into action at will under normal conditions and for this purpose the outer end of the tubular hub —17— is provided with a rigid gear or ratchet wheel —40— adapted to be engaged by a pawl —41— which together with a pivoted pawl supporting member —42— are pivotally mounted upon a rock arm —43—. This rock arm is journaled in a suitable bearing —44— on the inside of the cap —9— concentric with the axis of the tubular hub —17— and is provided with a finger piece —45— projecting outwardly through a circumferentially extending slot —46— in one side of said cap where it is easily accessible for rocking the plate —43— in opposite directions as best seen in Figs. 6, 7 and 8.

The pawl-supporting member —42— is pivoted by a screw —39— to the rock arm or plate —43— some distance to one side of the finger piece —45— and is normally pressed in one direction by a spring —48— to force the pawl —41— into engagement with the teeth of the ratchet wheel —40—, said pawl —41— being also pivoted by a screw —47— to its supporting member —42— so as to have an independent movement against the action of a retracting spring —49— as shown more clearly in Figs. 6 and 7.

The rock arm or plate —43— is adapted to be adjusted by the finger piece —45— to three different positions, as, for example, the central position shown in Figs. 2 and 3 and to opposite sides thereof as shown in Figs. 6 and 7.

A drag or brake member —50— is pivoted at —51— to the inner side of the cam —43— and is provided at its inner end with a cam —52— which is movable into and out of registration with a slot or opening —53— in the cap —9— as the rock arm —43— is shifted to and from its central position shown in Figs. 2 and 3 and when in the latter position, the brake shoe is forced into frictional contact with the outer face of the adjacent spool head —16— by means of a spring —54— as best seen in Figs. 3, 6, 7 and 8, thereby producing a slight retarding effect upon the reel to keep the line under reasonable tension when the clutch sections —22— and —23— are disengaged one from the other. If, however, it is desired to wind the line on the reel while the brake member is in this position at which time the spring arm —24— is depressed to throw the clutch members —22— and —23— into engagement with each other, the offset —26— on said arm will be brought into engagement with the cam —52—, thereby depressing this end of the brake lever —50— to throw the braking shoe out of contact with the spool head —16—, thus permitting the spools to be operated with greater freedom as the reel frame is moved back and forth along the toothed rack —1—. The slot —53— is of just sufficient width to permit the entrance of the cam —52— therein but when the lever is shifted from its central position either to the right or to the left as shown in Figs. 6 and 7, the cam —52— is depressed by riding against the underside of the cap —9—, thereby forcing and holding the brake member —50— from its braking position. The circumferential slot —46— in one side of the cap —9— therefore extends a sufficient distance beyond a radial line drawn through the opening —53— to permit the cam —52— to be moved into and out of registration with the opening —53— while the outer end of the pawl section —42— is spaced apart from the finger piece —45— a distance somewhat less than the length of the slot —46— so that when the plate —43— is shifted to the clicking position shown in Fig. 6, the outer end of the pawl section —42— will enter or project into the slot —46— to allow the pawl —41— to engage the teeth of the ratchet wheel —40—, while on the other hand as soon as the lever —43— is rocked from its clicking position shown in Fig. 6 to the position shown in either Figs. 3 or 7, the outer end of the pawl section —42— will ride against the inner face of the rim of the cap —9— and thereby force the pawl —41— out of engagement with the ratchet wheel, thus permitting action of the brake —50— when moved to its central position shown in Fig. 2 or permitting the free unretarded action of the reel when shifted to the position shown in Fig. 7, which latter may be termed the "releasing position."

*Line laying mechanism.*—During the operation of winding and unwinding the line upon and from the reel, it is desirable to gradually shift the line from side to side thereof in order that it may be wound or unwound more uniformly thereon and for this purpose I have provided what may be termed a "spooling mechanism" consisting of a screw —60— arranged parallel with the axis of the reel preferably at the front side thereof and having its inner and outer ends journaled in suitable bearings on the outer and inner plates —9— and —12— of the reel-supporting frame, said screw being engaged by a nut —61— having oppositely projecting fingers or arms —62—, one at least of which extends across the line of travel of the line at the inside thereof. Secured to the inner end of the spindle is a pinion —63— meshing with a gear —64— which is journaled on the inner plate —12— and is provided with a coaxial pinion —65— meshing with one side of the toothed rack —1— so as to rotate the screw in reverse directions as the reel-supporting frame is moved back and forth along said toothed rack, thereby moving the nut —61— and its arm —62— outwardly and inwardly upon each forward and backward movement of the reel frame. The portion of the line which is engaged by the arm —62— is disposed at an angle with the axis of the rod and tends to hug closely to the outer face of the inner reel head —16—. The only function of the arm —62— is to shift this portion of the line outwardly along the reel and to allow it to gradually return toward the inner end of the reel as the frame is moved back and forth along the rod, thereby distributing the line evenly throughout the entire length of the reel between the heads —16—.

The operation of my invention has been fully set forth in the foregoing description, and while I have shown and described the nut —61— and arm —62— as a means for shifting the line back and forth along the reel, it is evident that this nut and arm may be dispensed with and the line drawn against the opposite side of the threads of the screw which will perform the same function of shifting the line back and forth although not as positively as the nut and arm and therefore I do not wish to limit myself to the exact construction and arrangement of this and other parts of the reel.

What I claim is:

1. In combination with a fish rod, a reel frame movable in reverse directions along and upon the exterior of the rod, a reel in the frame, connections between the rod and reel for imparting rotary motion to said reel as the frame is moved in either direction, screw on the frame, a line shifter on the screw and means coacting with a part of said connections for rotating the screw in reverse directions as the frame is moved in opposite directions.

2. In combination with a fish rod, a reel supporting frame movable in reverse directions along the rod, a reel in the frame having its axis at right angles to the rod, connections between the reel and rod for imparting rotary motion to the reel as the frame is moved in either direction, a screw on the frame parallel with the axis of the reel, means for rotating the screw in opposite directions as the frame is moved in reverse directions, and line shifting means actuated by the screw lengthwise of the reel.

3. In combination with a fish rod, a line reeling mechanism mounted on the rod and comprising a reel-supporting frame movable in reverse directions along and upon the exterior of the rod, a reel journaled in the frame wholly at one side of the rod and having its axis at right angles to that of the rod, connections between the reel and rod for imparting rotary motion to the reel as the frame is moved in either direction, and means including a screw parallel with the axis of the reel for shifting the line lengthwise of the reel.

4. In combination with a fish rod, a toothed rack mounted upon and extending lengthwise of the rod, a reel-supporting frame movable in reverse directions along and upon the exterior of the rod lengthwise of the rack, a reel in the frame having its axis at right angles to the rack, connections between the rack and reel for imparting rotary motion to said reel as the frame is moved in either direction, a screw journaled in the frame parallel with the axis of the reel, connections between the screw and rack for rotating the screw as the frame is moved in either direction, and line shifting means actuated by the screw.

5. In combination with a fish rod, a toothed rack mounted on the rod lengthwise thereof, a reel-supporting frame movable lengthwise of the rack in reverse directions, a reel mounted in the frame and having its axis at right angles to the rack, connections between the reel and rack for rotating the reel in one and the same direction as the frame is moved in either direction, a screw mounted in the frame parallel with the axis of the reel, connections between the screw and rack for rotating the screw in opposite directions as the frame is moved in reverse directions, and line shifting means actuated by the screw.

6. In combination with a fish rod having clamping members one of which is slidable endwise thereon toward and from the other clamping member, a foot piece loosely seated on the rod and engaged by said clamping members to hold it in place, a toothed rack having one end detachably interlocked with the foot piece and its other end provided with a spring clamp embracing the rod and slidable thereon, a line reeling mechanism movable lengthwise of the rack and including a reel having operative connection with the rack to rotate the reel in one and the same direction as the reeling mechanism is moved lengthwise of the rod in either direction.

7. In combination with a fish rod, a line reeling mechanism comprising a toothed rack extending lengthwise of the rod and having one end provided with a spring clamp embracing said rod slidable thereon, movable means for detachably securing the opposite end of the rack to the rod, a reel frame movable in reverse directions lengthwise of the rack, a reel in the frame having its axis at right angles to the rack, and connections between the toothed rack and reel for rotating the latter as the frame is moved in either direction.

8. In combination with a fish rod, a reel-supporting frame movable lengthwise of the rod and having an opening in one side thereof, a reel mounted in the frame and having its axis at right angles to that of the rod, connections between the reel and rod for imparting rotary motion to the reel as the frame is moved in either direction, said connections including a clutch, a drag spring pressed into frictional contact with the reel and having a portion thereof projecting into the opening in the frame, and means operable at will for forcing the clutch to its clutching position and for simultaneously forcing the drag from its dragging position.

9. A line reeling mechanism for fish rods comprising a reel and supporting frame therefor, a rock arm mounted on the frame coaxial with the reel and movable circumferentially to different positions, a drag lever on the rock arm and spring pressed into frictional engagement with the reel when the rock arm is in one position, and coacting members on the frame and drag lever for forcing the drag lever from its dragging position when the rock arm is shifted to another position for permitting the free rotation of the reel.

10. A line mechanism for fish rods comprising a reel and supporting frame therefor, a rock arm mounted on the frame coaxial with the reel and movable circumferentially to different positions, a drag lever on the rock arm and spring pressed into frictional engagement with the reel when the rock arm is in one position, coacting members on the frame and drag lever for forcing the drag lever from its dragging position when the rock arm is shifted to another position for permitting the free rotation of the reel, and means for permitting the free rotation of the reel, and means brought into action by the shifting of the rock arm to still another position for producing audible clicks when the reel is rotated.

11. In a line reeling mechanism, a reel and supporting frame therefor, a ratchet wheel on the reel, a rock arm journaled on the frame coaxial with the reel, and movable at will circumferentially to different radial positions, a pawl supporting member pivoted to the rock arm, a pawl pivoted to said member and engaging the teeth of the ratchet wheel when the arm is in one position for producing an audible click as the reel is rotated, and means for rocking the pawl supporting member to disengage the pawl from the ratchet wheel when the rocking member is shifted to another position.

12. In a line reeling mechanism for fish rods, a reel and a supporting frame therefor having a slot in one side, a rock arm coaxial with the reel and movable in said slot to a central position and to opposite end positions, a drag, and a clicking device both mounted upon the rock arm, means for forcing the drag to its dragging position when the rock arm is in its central position with reference to the slot, additional means for forcing the clicking device to its clicking position when the rock arm is moved to one end of the slot, and separate means for forcing the drag from its dragging position and also for forcing the clicking device from its clicking position when the rock lever is moved to the opposite end of the slot.

13. In combination with a fish rod, a reel-supporting frame movable in reverse directions along and upon the exterior of the rod, a driving shaft, a rotary element and connections between said element and the shaft for imparting rotary motion to said element as the frame is moved in either direction, spool flanges connected to each other and loosely mounted upon said rotary element for independent rotary movement, and slip connections between the spool and said rotary element.

14. In a line reeling mechanism, a driving shaft, a hub loosely mounted on the shaft, clutch connections between the shaft and hub, spool flanges connected to each other and loosely mounted upon the hub for independent rotation, a ratchet wheel rigidly secured to the hub, and a pawl connected to one of the flanges and spring pressed into contact with the teeth of the ratchet wheel.

15. In combination with a fish rod, a toothed rack mounted on the rod lengthwise thereof, a reel-supporting frame slidable in reverse directions along the rack, a driving shaft disposed at substantially right angles to the rack, connections between the rack and driving shaft for imparting rotary motion thereto as the frame is moved in either direction, a tubular hub journaled in the frame and surrounding the shaft, clutch connection between the shaft and hub, spool flanges connected to each other and loosely mounted on the hub for independent rotation, a ratchet rigid on the hub, a pawl connected to one of the flanges and spring pressed into engagement with the ratchet wheel, a screw journaled in the frame parallel with the driving shaft, connections between the rack and screw for rotating said screw in reverse directions as the direction of movement of the frame is reversed, and a line shifting device actuated back and forth by the screw along the reel.

In witness whereof I have hereunto set my hand on this eighteenth day of March 1911.

JOHN A. RICKETTS.

Witnesses:
M. SCHOENEBERG,
LOREN N. ROBBINS.